(No Model.) 2 Sheets—Sheet 1.

W. H. FAY.
WINE COOLER.

No. 502,114. Patented July 25, 1893.

Witnesses:—
M. P. Smith.
Geo. Thorpe.

Inventor:—
William H. Fay.
By Higdon & Higdon Att'ys.

(No Model.)
W. H. FAY.
WINE COOLER.
No. 502,114. Patented July 25, 1893.
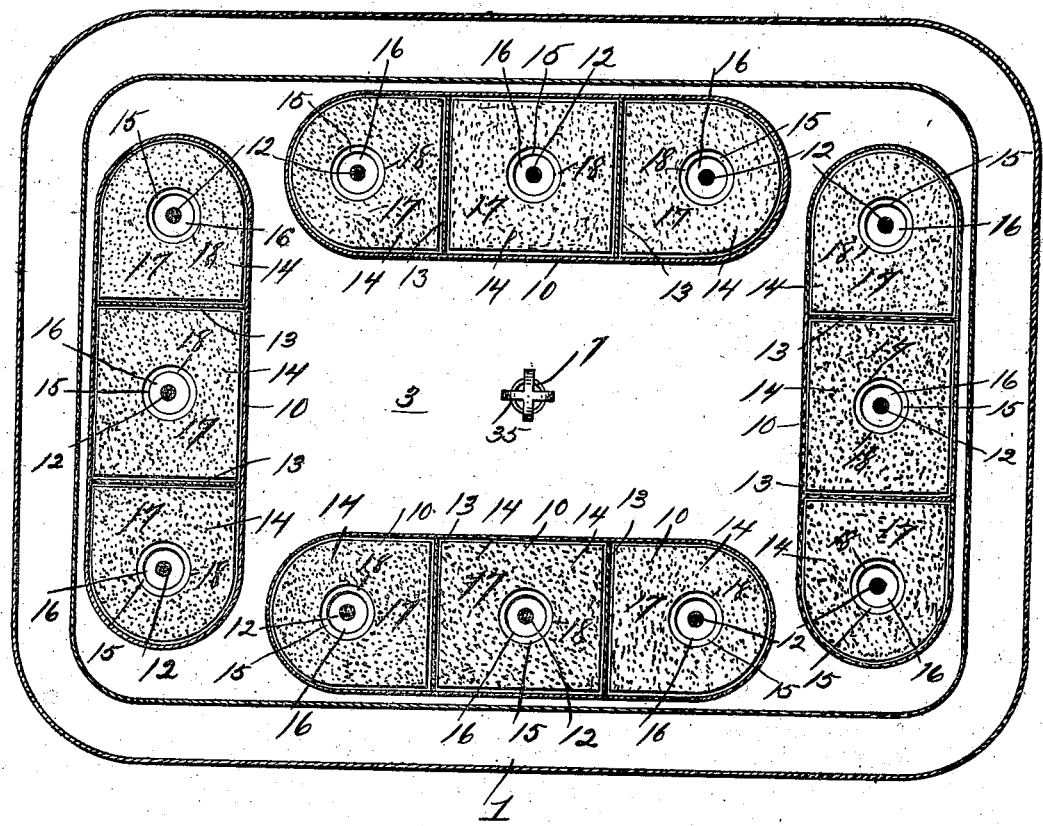
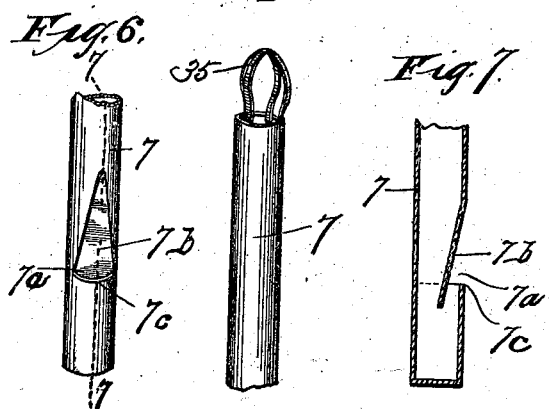
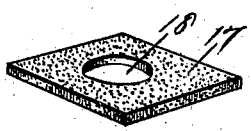
Witnesses:
W. P. Smith.
Inventor:
William H. Fay.
By Higdon & Higdon
Attys.

UNITED STATES PATENT OFFICE.

WILLIAM H. FAY, OF KANSAS CITY, MISSOURI, ASSIGNOR OF ONE-HALF TO FRANK G. MITCHELL, OF SAME PLACE.

WINE-COOLER.

SPECIFICATION forming part of Letters Patent No. 502,114, dated July 25, 1893.

Application filed December 22, 1892. Serial No. 456,030. (No model.)

*To all whom it may concern:*

Be it known that I, WILLIAM H. FAY, of Kansas City, Jackson county, Missouri, have invented certain new and useful Improvements in Coolers for Wines and Liquors, of which the following is a full, clear, and exact description, reference being had to the accompanying drawings, forming a part hereof.

My invention relates to improvements in coolers for wines and liquors, and the objects of my invention are to produce a portable cooler which may be placed directly under the bar and within convenient distance from the bar tender and which may be resupplied with ice whenever necessary, without the necessity of removing or disturbing the bottles contained therein, and a cooler wherein the bottles may be kept cool without coming in direct contact with the ice; and a cooler which is simple, inexpensive and durable in construction.

To the above purposes my invention consists in certain peculiar and novel features of construction and arrangement as hereinafter specified and claimed.

In order that my invention may be fully understood, I will proceed to describe it with reference to the accompanying drawings, in which—

Figure 1:
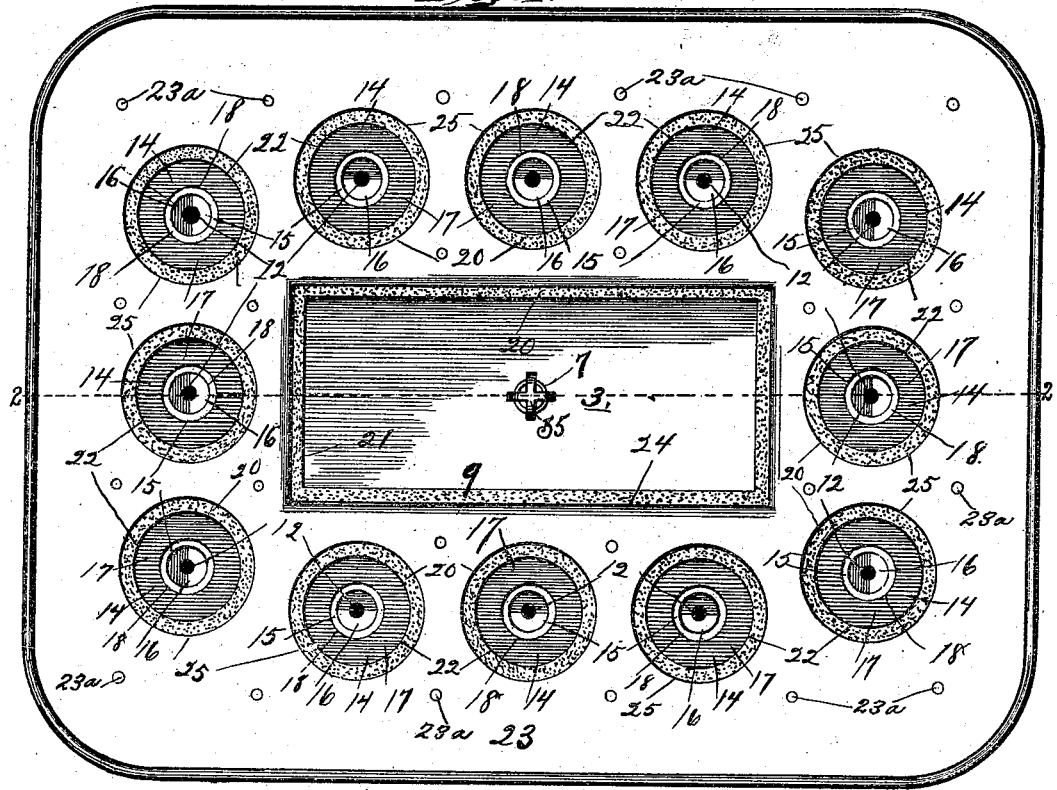
Figure 2:
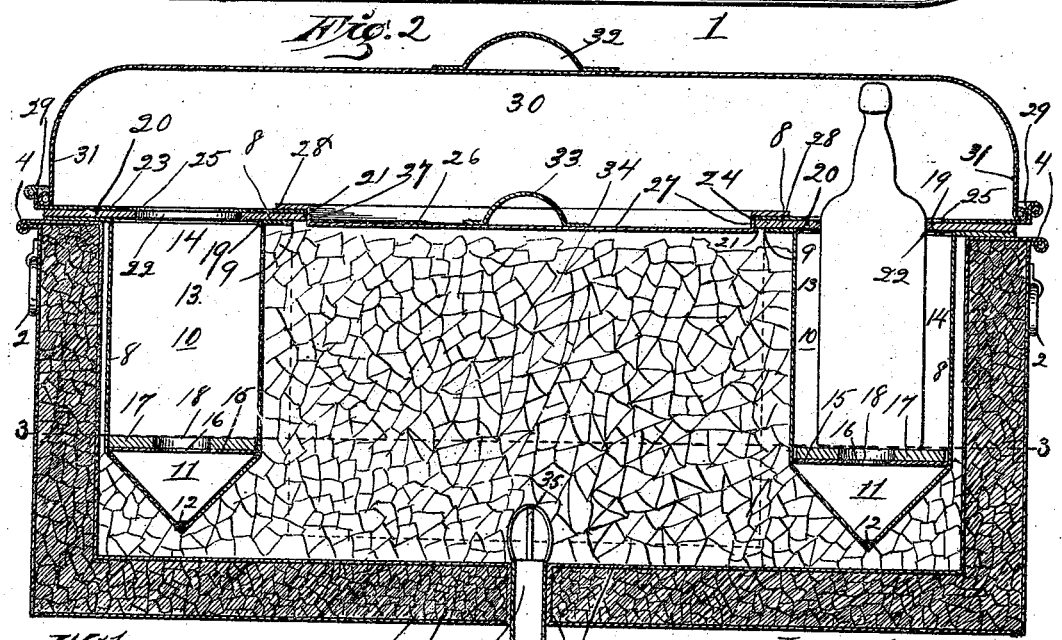

Figure 1, is a top plan view of a cooler embodying my improvements with the top or outer cover and the ice cover or trap-door removed. Fig. 2, is a vertical longitudinal sectional view taken upon the line 2—2 of Fig. 1, and showing the outer cover and the ice cover or trap-door in position. Fig. 3, is a horizontal sectional view taken on the line 3—3 of Fig. 2 and with the ice receptacle empty. Fig. 4, is a detail perspective view of the upper end of the escape tube to convey the water from the cooler. Fig. 5, is a detail perspective view of one of the cushion pads upon which the bottles rest when in position. Fig. 6, is a detail perspective view of the lower end of the escape tube for water. Fig. 7, is a vertical sectional view taken on the line 7—7 of Fig. 6.

In the drawings, 1 represents a rectangular receptacle or pan provided with handles 2 secured at opposite ends thereof.

3 represents a receptacle or pan similar in shape but smaller than the pan 1, which pan 3 is placed within the receptacle or pan 1, and the horizontal marginal flanges 4 at the upper edge thereof, rest upon the upper edges of the receptacle or pan 1 and support the pan 3 in proper position. The intervening space between the receptacles or pans 1 and 3 is filled with charcoal 5 or sawdust or other suitable packing material, impervious to changes in the temperature. These receptacles 1 and 3, after the charcoal or other packing material is placed between them, may be permanently connected together, as illustrated in the drawings, the margin of the flanges 4, being turned or bent around the upper edge of the receptacle 1.

A short tube 6, connects the bottom of the receptacles 1 and 3, and communicates with openings or holes therethrough. An escape tube 7 projects vertically through the short tube 6, and communicates with the interior of the pan 3. The lower end of this tube is closed and a suitable distance from the bottom of the tube, an opening $7^a$ is made, and the portion $7^b$ of the tube, is of such length as to project a slight distance below the lower margin $7^c$ of the opening $7^a$; the result of this construction is to provide a water-trap, at the lower end of the tube 7, the object of which will be hereinafter explained.

A plate 8 of marginal contour preferably to correspond with the contour of the receptacles 1 and 3 is placed upon the receptacles 3 and is provided with an enlarged central opening 9 which communicates with the interior of the receptacle or pan 3. This plate 8 is further provided at the opposite ends and sides of the opening 9 with depending and elongated rectangular casings 10, the sides of which, a suitable distance from the lower end, are turned inward and downward to form the V-shaped bottoms 11, which are provided with holes or openings 12, the object of which will be hereinafter referred to. These casings 10 are divided by vertical partitions 13 into separate chambers or compartments 14 and a partition or base plate 15 to fit the interior of each compartment or chamber 14 is horizontally supported therein, a suitable distance above the apex of the V-shaped bottom. This horizontal partition or base plate 15 is provided with a central opening 16 therethrough, and a cushion pad 17 of rubber or other suitable material, and of shape to fit each compartment, is placed upon the horizontal partition 15, and is also provided with a central opening 16 of the partition 15. The plate 8 is further provided with an opening 19 in alignment with and communicating with each compartment 14 of the casings 10.

A cushion pad 20 of rubber or other suitable material and of contour to correspond with the plate 8 is fitted upon the plate 8 and is provided with an opening 21 in its center, of the same shape, but slightly smaller than the opening 9 of the plate 8. This cushion pad 20 is further provided with circular openings 22 in alignment with, but smaller than the openings 19 of the plate 8. A top plate 23, of marginal contour to correspond, is fitted upon the cushion pad 20 and is secured rigidly thereto, and to the plate 8 by through rivets 23ª, and is provided with a central opening 24 slightly larger, preferably than the opening 21 of the cushion pad 20. The top plate 23, is further provided with a number of openings 25 larger than, and communicating with the openings 22 of the cushion pad 20.

A removable trap door or cover 26 is bent near its marginal edges, vertically upward at 27, and horizontally outward to form supporting flanges 28, and is fitted into the openings 24, 21 and 9, of the top-plate 23, the cushion pad 20 and the plate 8, respectively; the projecting edges of the cushion pad (as shown in Fig. 2) fitting closely against the vertical portion 27 of said trap-door or cover, and preventing the entrance of air to the interior of the casing 3. The plate 23 is further provided with a vertical marginal flange 29 extending upwardly therefrom, and a cover 30 is provided with depending marginal flanges 31 which rest upon the top-plate 23 within the flange 29. The cover 30 is provided with a handle 32 by which it may be removed when desirable. The trap-door or cover, is also provided with a handle 33, by which it also may be removed when necessary or desirable. The arrangement of the depending casings 10 relative to the top-plate 6 is such that when placed within the casing 3, the ice 34 which is introduced through the openings 24, 21 and 9 of the top-plate 23, the cushion pad 20 and plate 9, is allowed to fill up the interior of the casing 3 and entirely surround each casing 10.

To prevent the smaller particles of ice from passing through or choking the open end of the water-escape pipe 7, I provide a skeleton cap 35 which is secured to the open upper end of said pipe and projects into the interior of the pan 3; the openings in said skeleton cap being of such size, as to prevent the smaller particles of ice from entering therethrough and falling through the tube 7, after the casing 3 is filled with ice as described.

The bottles containing wine or liquor are forced through the openings 25 and 22 of the top-plate 23, and the cushion pad 20 respectively, until the bottom of said bottles rest upon the cushion pads 17 in the bottom of the compartments or chambers 14 of the casings 10 and the openings 22 of the cushion pad 20, fitting snugly around the upper portion of the bottle (as illustrated in Fig. 2) prevents outside air from entering the bottle compartments, and also prevents the cold air within said compartments from escaping therefrom; the cover 30 is then placed upon the top-plate 23 entirely inclosing the upper ends of said bottles and preventing the entrance of air thereto.

When a bottle is desired from the cooler, the cover 30 is removed and the particular bottle desired lifted from its compartment and placed upon the bar without wetting or soiling the bar in the slightest degree. When desirable, the bottle is reintroduced into the compartment, the cushion pads 17 and 20 at the bottom and upper end of the bottle compartments or chambers, preventing any undesirable noise or clatter. As the bottle is withdrawn from its compartment, a slight suction results, causing a draft of cold air to pass up through the openings 12 in the V-shaped bottom of the casings 10 and enter each compartment or chamber 14, and any small quantity of water, due to the melting of the ice, which is drawn into the V-shaped bottom of the casing by such suction, immediately, by reason of the inclined walls thereof, escapes through the openings 12 and the water from the melting ice at all times and continually, passes into the escape tube 7, fills the water-trap in the lower end thereof, and overflows into a suitable receptacle (not shown) which is placed in convenient position for the purpose. The water-line in the water-trap formed at the lower end of the tube 7, being always above the open lower end of the tube, prevents the outside warm air from passing upward through the said tube into the ice compartment, and increasing the melting of the ice.

From the above description, it will be seen that I have produced a cooler for bottled wines and liquors which is portable, and into which can be introduced at any time without disturbing or displacing the bottles contained therein, a new supply of ice, which thoroughly surrounds and keeps cool the compartments containing the bottles; also a cooler in which the bottles can be readily and easily removed from or placed within said cooler without coming into direct contact with the ice, and further a cooler which is simple, inexpensive and durable of construction.

Having thus described my invention, what I claim as new, and desire to secure by Letters Patent, is—

1. A cooler for wines and liquors, comprising a receptacle, a smaller receptacle for ice supported within said first named receptacle and having a water-escape tube communicating therewith, and a plate closing the open ends of said receptacles and having casings or sockets depending therefrom into the ice-receptacle, and having openings in their lower ends, substantially as and for the purpose set forth.

2. In a cooler for wines and liquors, the combination with a receptacle, and an ice receptacle supported within the first named receptacle, and a water-escape pipe communicating with the ice receptacle, and a packing filled in between said receptacles, of a plate closing the open ends of said receptacles, and having a central opening, and casings or sockets depending within the ice-receptacle and having V-shaped bottoms provided with openings, and a removable trap-door or cover adapted to close the central opening, substantially as set forth.

3. In a cooler for wines and liquors, the combination with an ice-receptacle, and a water-escape tube communicating therewith, of a plate closing the open end of said ice-receptacle, and having casings or sockets depending therefrom into the ice-receptacle, and having V-shaped bottoms provided with holes or openings, a number of partitions dividing said casings or sockets into separate compartments or chambers, and a horizontal partition supported above the bottom of each compartment or chamber, and an opening formed through each partition, substantially as set forth.

4. In a cooler for wines and liquors, the combination with an ice receptacle having a water-escape tube communicating therewith, of a plate closing the open end of said ice-receptacle, casings or sockets depending from said plate into the ice receptacle, and vertical partitions dividing the casings or sockets into separate compartments or chambers, and a cushion-pad having a central opening communicating with the opening of the plate, and with a number of smaller openings communicating each with a compartment or chamber of the casings or sockets, and a top-plate secured upon the cushion pad and formed with an opening registering with the central openings of the cushion-pad and the plate carrying the casings, and also formed with a number of openings communicating with and slightly larger than the openings of the cushion-pad, and a removable trap-door or cover adapted to close the central openings of the top-plate, the cushion-pad and the plate carrying the depending casings, substantially as set forth.

5. In a cooler for wines and liquors, the combination with an ice-receptacle, and a water escape tube communicating therewith, of a plate closing the open end of said ice-receptacle, and having casings or sockets depending therefrom into the ice-receptacle, and having V-shaped bottoms provided with holes or openings, a number of partitions dividing said casings or sockets into separate compartments or chambers, and a horizontal partition supported above the bottom of each compartment or chamber, and an opening formed through each partition, and a cushion-pad resting upon each horizontal partition and formed with an opening communicating with the opening of said horizontal partition, substantially as set forth.

In testimony whereof I affix my signature in the presence of two witnesses.

WILLIAM H. FAY.

Witnesses:
MAUD FITZPATRICK,
MARTIN P. SMITH.